United States Patent [19]
Schrimpf et al.

[11] Patent Number: 5,334,323
[45] Date of Patent: Aug. 2, 1994

[54] DEICING OR ANTIICING FLUIDS FOR AIRCRAFT

[75] Inventors: Hans Schrimpf, Mutterstadt; Hans Krebs, Hassloch; Gert Liebold, Edingen-Neckarhausen; Guenter Frey, Dannstadt-Schauernheim, all of Fed. Rep. of Germany

[73] Assignee: BASF Aktiengesellschaft, Ludwigshafen, Fed. Rep. of Germany

[21] Appl. No.: 687,209

[22] Filed: Apr. 18, 1991

Related U.S. Application Data

[63] Continuation of Ser. No. 408,234, Sep. 18, 1989, abandoned.

[30] Foreign Application Priority Data

Sep. 23, 1988 [DE] Fed. Rep. of Germany ....... 3832310

[51] Int. Cl.$^5$ ............................................. C09K 3/18
[52] U.S. Cl. ...................................... 252/70; 252/73; 252/74; 252/79; 106/13
[58] Field of Search ........................ 252/70, 73, 74, 79; 106/13

[56] References Cited

U.S. PATENT DOCUMENTS

| | | | |
|---|---|---|---|
| 4,064,065 | 12/1977 | Stoll | 252/70 |
| 4,358,389 | 11/1982 | König-Lumer et al. | 252/70 |
| 4,954,279 | 9/1990 | Ma et al. | 252/70 |

FOREIGN PATENT DOCUMENTS

| | | |
|---|---|---|
| 0231869 | 8/1987 | European Pat. Off. . |
| 2423893 | 12/1975 | Fed. Rep. of Germany . |
| 1285862 | 8/1972 | United Kingdom . |

*Primary Examiner*—Paul Lieberman
*Assistant Examiner*—Necholus Ogden

[57] ABSTRACT

Deicing/antiicing fluids for aircraft which contain essentially glycols, crosslinked polyacrylic acid, a nonionic surfactant based on alkoxylated $C_{10}$–$C_{20}$ alcohols, corrosion inhibitors, a mixture of NaOH and KOH, an antioxidant and water, reduce the loss of lift by having improved runoff characteristics from the wings while giving a refreeze holdover time of not less than 30 minutes.

11 Claims, No Drawings

DEICING OR ANTIICING FLUIDS FOR AIRCRAFT

This is a continuation of co-pending application Ser. No. 07/408,234 filed on Sep. 18. 1989 now abandoned.

The present invention relates to novel deicing or antiicing fluids comprising glycols, water, crosslinked acrylic acid polymers as thickeners, corrosion inhibitors, neutralizing agents for setting the pH and a nonionic surfactant based on an ethoxylated alcohol. The novel fluid has the particular advantage that, within the critical temperature range from 0° C. to −35° C., it has, on account of its optimal theological properties, very good runoff properties at aircraft takeoff and thus ensures a very small loss of lift. Owing to the very low viscosity of the novel fluid, a holdover time to freezing rain of more than 30 minutes is obtained in the Association of European Airlines (AEA) freezing rain endurance test.

Deicing or antiicing fluids for aircraft are known for example from EP-A1-0,231,869 and consist essentially of:

a) from 40 to 70% by weight, preferably from 50 to 60% by weight, of a glycol from the group of the alkylene glycols of 2 or 3 carbon atoms and oxyalkylene glycols of from 4 to 6 carbon atoms;

b) from 0.1 to 1% by weight, preferably from 0.2 to 0.7% by weight, of crosslinked acrylic polymers consisting of 1 part by weight of a crosslinked copolymer of acrylic acid of an alkali metal acrylate and acrylamide with from 10 to 90% by weight, preferably from 20 to 80% by weight, of copolymerized units of acrylic acid or of the alkali metal acrylate and from 10 to 90% by weight, preferably from 3 to 8 parts by weight, of crosslinked homopolymer of acrylic acid or an alkali metal acrylate, with the proviso that the homopolymer and the copolymer each have a viscosity of from 5000 to 70,000 mPa.s, preferably 10,000 to 50,000 mPa.s, and laminar flow characteristics at a shear rate of 0 to 20,000 s$^{-1}$, the viscosity and the laminar flow characteristics each being measured with the aid of a 0.5% strength by weight aqueous solution at 20° C. and a pH of 7 using a Brookfield viscometer at 20 rpm and a rotary viscometer for shear rates up to 20,000 s$^{-1}$, respectively;

c) from 0.05 to 1% by weight of surfactant from the group of the alkali metal alkylarylsulfonates;

d) from 0.01 to 1% by weight, preferably from 0.03 to 0.5% by weight, of one or more corrosion inhibitors;

e) the following three basic compounds $e_1$, $e_2$ and $e_3$ in the stated ratios for setting the fluid pH to 7.5 to 11, preferably 8 to 10;

$e_1$) from 0.01 to 1% by weight, preferably from 0.05 to 0.5% by weight, of ammonia, monoethanolamine, diethanolamine or triethanolamine or a mixture thereof (as the first basic representative);

$e_2$) from 0.05 to 0.7% by weight, preferably from 0.07 to 0.4% by weight, of potassium hydroxide (as the second basic representative); and $e_3$) from 0.01 to 0.5% by weight, preferably from 0.03 to 0.15% by weight, of a further alkali metal hydroxide, preferably sodium hydroxide (as the third basic representative); and f) water to make up to 100% by weight, the weight percentages each being based on the weight of the fluid.

Known aircraft deicing or antiicing fluids of the aforementioned type have long been used in practice. However, flight tests for determining the loss of lift due to aircraft antiicing fluids and wind tunnel tests have shown that the runoff characteristics of aircraft antiicing agents of the type described above, having a viscosity range from 10,000 mPa.s to 20,000 mPa.s, measured using a Brookfield viscometer at 0.3 rpm at from 20° C. to −25 C., are still not ideal.

This is because the prior art deicing agents are responsible for a 5–8% loss of aircraft lift on takeoff. On the basis of these test results, the AEA made it a requirement at the start of 1988 that the deicing fluids then in use must be improved in respect of runoff from the wing in order to reduce still further the loss of lift at takeoff.

An improvement in the runoff characteristics of such nonnewtonian fluids is possible for example by reducing the viscosity of the undiluted fluid from for example 10,000 mPa.s to 2000–4000 mPa.s at 0.3 rpm if this does not increase the elasticity of the fluid to any significant extent.

It is a general object of the present invention to provide an aircraft antiicing fluid whose runoff characteristics are comparatively favorable over the entire temperature range from 0° C. to −35° C. encountered in practice. This requirement may also be restated as demanding that the viscosity of the fluid merely vary within a narrow viscosity range of about 2000 mPa.s at the stated temperatures.

Such a fluid must not only have good rheological properties but also ensure that the holdover time to freezing rain, as determined by the AEA freezing rain endurance test, is not less than 30 minutes. This requirement is only very difficult to satisfy with fluids of low viscosity.

With existing aircraft deicing and antiicing fluids, a decreasing stationary viscosity also reduces the holdover time to freezing rain.

Deicing and antiicing fluids for aircraft are occasionally diluted before use with water, preferably in a ratio of 75 (fluid):25 (water) or 50:50. If hard water is used, it has been found in the case of the prior art deicing fluids that, depending on the water hardness, there is a corresponding decrease in the stationary viscosity and hence also a certain decrease in the holdover time.

Since demineralized water for diluting fluid is in general only rarely available at airports, the viscosity of a dilute solution prepared with tap water should not decrease in order that a significant decrease in the holdover time to freezing rain may be avoided. A holdover time (as measured by the AEA freezing rain endurance test) of not less than 20 minutes for a 75 (fluid):25 (water) solution would be desirable.

It is a particular object of the present invention to provide a deicing and antiicing fluid for aircraft which meets the high requirements of a low viscosity, to obtain good runoff characteristics on takeoff over the entire temperature range from about 0 to about −35° C., while ensuring a minimum time between deicing and reicing with freezing rain of not less than 30 minutes in the AEA freezing rain endurance test. It is a further object of the present invention that the fluid be miscible with hard water without loss of viscosity.

SUMMARY OF THE INVENTION

We have found, surprisingly, that this object is achieved, and that the still existing disadvantages of the known deicing and antiicing fluids for aircraft are eliminated, by a fluid with the stated desired properties which contains as a thickener a crosslinked polyacrylic acid, as a pH control of sodium hydroxide, or sodium hydroxide and potassium hydroxide in a certain ratio to each other, and a nonionic surfactant selected from the group consisting of the ethoxylated alcohols, in particular oxo alcohols.

DETAILED DESCRIPTION OF THE PREFERRED EMBODIMENTS

In detail, the novel deicing or antiicing fluid for aircraft based on glycols and water and a crosslinked polyacrylic acid as thickener contains essentially:

a) from 40 to 70% by weight, preferably from 50 to 60% by weight, of a glycol of the group of the alkylene glycols of 2 or 3 carbon atoms and/or oxyalkylene glycols of 4 carbon atoms, or mixtures thereof, b) from 0.1 to 1.0% by weight, preferably from 0.3 to 0.7% by weight, of a crosslinked polyacrylic acid, c) from 0.2 to 0.7, preferably from 0.3 to 0.5, % by weight of a mixture of potassium hydroxide and sodium hydroxide having a potassium hydroxide content up to 70% by weight, preferably in a ratio of from 2.5:1 to 1:2.5, particularly preferably in a ratio of about 1.5:1.0, or of pure sodium hydroxide, d) from 0.05 to 2.0% by weight, preferably 1.0 to 1.7% by weight, of one or more corrosion inhibitors, preferably 2 corrosion inhibitors, e) from 0.02 to 1.5% by weight, preferably from 0.05 to 0.3% by weight, of a nonionic surfactant from the group of the higher alcohols, preferably the $C_{10}$-$C_{20}$ oxo alcohols, ethoxylated with from 1 to 10 molecules of a low molecular weight alkoxide, preferably ethylene oxide, f) from 0.01 to 0.1% by weight of an antioxidant, and g) water to 100% by weight, all the weight percentages being based on the ready-prepared undiluted fluid.

It has been found that the stated combination of crosslinked polyacrylic acid and preferably potassium hydroxide and sodium hydroxide ratio of from 1:1 to 1.5:1, or sodium hydroxide, gives the desired properties of an almost constant low viscosity at low temperatures and hence good runoff characteristics. The addition of a nonionic surfactant from the group of the ethoxylated oxo alcohols even produces an improvement in the holdover time to freezing rain, which for similar viscosities is distinctly above the times of the prior art deicing and antiicing fluids and was unexpected. The viscosity sensitivity of known deicing and antiicing fluids to hard water has been removed in the fluid according to the invention up to about 20° German hardness. The novel fluid is also notable at high dilution with water for very low foaming, compared with existing deicers.

Component a) of the deicing or antiicing fluid according to the invention is preferably propylene glycol (1,2-propylene glycol or 1,3-propylene glycol) and/or diethylene glycol.

Component b) is for example a commercial crosslinked polyacrylic acid which in the form of a 0.5% strength by weight aqueous solution at pH 7.0 has a viscosity of from 5000 to 60,000 mPa.s at 20° C., measured with a Brookfield viscometer at 20 rpm, for example CARBOPOL® 934 from Goodrich Chemical (Deutschland) GmbH.

Component c), with which the pH of the fluid according to the invention is adjusted to 7.0–9.5, is preferably a mixture of KOH and NaOH in a weight ratio of from 2.51 to 1:2.5.

Component d) comprises corrosion inhibitors of the type customary for fluids based on glycols and water.

Suitable corrosion inhibitors are for example sodium nitrate, the potassium and sodium salts of sebacic acid, 1,4-but-2-ynediol and benzotriazole.

Component e), which is included in the fluid according to the invention to obtain the required holdover time under freezing rain of not less than 30 minutes, is a nonionic surfactant from the group of the ethoxylated higher alcohols, in particular oxo alcohols, of from 10 to 20 carbon atoms and from 1 to 10 molecules of an alkoxide, in particular ethylene oxide. Oxo alcohols of from 10 to 20 carbon atoms are for example the alcohols obtainable by the hydroformylation of $C_9$-$C_{12}$- or $C_{16}$-olefins, or mixtures thereof.

Component g) is water, preferably fully demineralized water.

The composition according to the invention is prepared by mixing the individual components together in any desired order in a stirred vessel.

An advantageous method of preparation may be described as follows:

A vessel is charged with water, the pulverulent crosslinked polyacrylic acid (component b) is added to the water at room temperature, and the mixture is stirred until the thickener is homogeneously dispersed in the water. The inhibitors and neutralizing agents are then introduced with stirring until the desired pH is obtained. Thereafter the glycol is added and stirred in until a homogeneous mixture has formed.

The deicing or antiicing fluid according to the invention is notable for the following properties:

a very low viscosity within the temperature range from 0° C. to −35° C., the viscosity at 0.3 rpm (Brookfield viscometer) varying merely within the narrow range from about 1000 to 2000 mPa.s; very good runoff characteristics from the aircraft wing on takeoff; a very long holdover time; no decrease in the viscosity on dilution with hard water; good anticorrosivity and compatibility with aircraft materials; a long shelf life; and low foxing on high dilution with water.

To preserve the deiced aircraft surfaces, the deicing or antiicing fluid according to the invention is used undiluted.

The invention is further illustrated by the following Examples:

EXAMPLE 1

A composition according to the invention was prepared by mixing the following components:

a) 50% by weight of 1,2-propylene glycol b) 0.53% by weight of CARBOPOL® from B.F. Goodrich Chemical (Deutschland) GmbH c) 0.05% by weight of sodium nitrate 0.05% by weight of sebacic acid d) 0.1 % by weight of oxo alcohol of from 13 to 15 carbon atoms, ethoxylated with 3 molecules of ethylene oxide e) 0.15% by weight of sodium hydroxide 0.22% by weight of potassium hydroxide f) 0.01% by weight of antioxidant g) 48.89% by weight of water.

In a stirred vessel, the pulverulent thickener (component b) was stirred into the initially introduced water until the mixture was homogeneous. Thereafter the corrosion inhibitors (component c), the surfactant (component d), the antioxidant and the neutralizing agent (component e) were added with stirring in the desired order until the solution was homogeneous. 1,2-Propylene glycol was then added and stirred in until the mixture was homogeneous. The pH of the ready-prepared mixture was 9.0.

The deicing and antiicing fluid according to the invention had the following properties:

the holdover time as measured by the AEA freezing rain endurance test was 37 minutes without dilution and 35 minutes on 75:25 dilution with AEA water. Foam characteristics of a 2% strength by weight aqueous solution:

| (Test according to ASTM D 892) | |
| --- | --- |
| Foam volume after 5 minutes: | 350 cm$^3$ |
| Foam volume after 5 minutes' standing: | 80 cm$^3$. |

The viscosities at various temperatures and the shear rate of 0,084 s$^{-1}$ (0.30 rpm) and 8.45 s$^{-1}$ (30 rpm) measured with a Brookfield viscometer, were as follows:

| Temperature (°C.) | Brookfield viscosity at | | Dilution 75:25 (AEA water) 0.3 rpm |
| --- | --- | --- | --- |
| | 0.3 rpm | 30 rpm | |
| | (mPa.s) | | |
| +20 | 3000 | 370 | 10,000 |
| ±0 | 2200 | 440 | 19,000 |
| −5 | 1600 | 460 | 14,000 |
| −10 | 1800 | 500 | 13,000 |
| −25 | 1000 | 520 | — |

EXAMPLE 2

A composition according to the invention was prepared by mixing the following components:
a) 60% by weight of diethylene glycol
b) 35% by weight of 1.5% strength by weight aqueous
thickener solution of CARBOPOL ® 934
c) 0.05% by weight of sodium nitrate, 0.1% by weight
of sebacic acid, 1.0% by weight of 1,4-but-2nediol
d) 0.05% by weight of an oxo alcohol of from 13 to 15 carbon atoms, ethoxylated with 3 molecules of ethylene oxide
e) 0.2% by weight of sodium hydroxide
f) 0.1% by weight of potassium hydroxide
g) 0.05% by weight of antioxidant
3.45% by weight of water.

Components a) to g) were mixed as described in Example 1. The ready-prepared mixture had a pH of 7.2.
The holdover time was 39 minutes undiluted and 23 minutes for a 75:25 dilution with AEA water.

| Foam test as in Example 1: | |
| --- | --- |
| Foam volume after 5 minutes: | 310 cm$^3$ |
| Foam volume after 5 minutes' standing: | 170 cm$^3$. |

The viscosities, measured as in Example 1, were as follows:

| Temperature (°C.) | Brookfield viscosity at | | Dilution 75:25 (AEA water) 0.3 rpm |
| --- | --- | --- | --- |
| | 0.3 rpm | 30 rpm | |
| | (mPa.s) | | |
| +20 | 2000 | 400 | 5,000 |
| ±0 | 1000 | 500 | 12,000 |
| −5 | 1500 | 520 | 16,000 |
| −10 | <1000 | 470 | 19,000 |
| −25 | <1000 | 900 | — |
| −35 | <1000 | 700 | — |

EXAMPLE 3

A composition according to the invention was prepared by mixing the following components:
a) 30% by weight of diethylene glycol and
25% by weight of 1,2-propylene glycol
b) 35% by weight of a 1.5% strength by weight thickener solution of CARBOPOL ® 934
c) 1.0% by weight of 1,4-but-2-ynediol
0.1% by weight of sebacic acid
0.07% by weight of sodium nitrate
d) 0.07% by weight of an oxo alcohol of from 13 to 15 carbon atoms, ethoxylated with 3 molecules of ethylene oxide
e) 0.2% by weight of sodium hydroxide
0.1% by weight of potassium hydroxide
f) 0.05% by weight of antioxidant
g) 8.43% by weight of water.

Components a) to g) were mixed as described in Example 1. The ready-prepared mixture had a pH of 7.2.
The holdover time was 37 minutes undiluted and 22 minutes for a 75:25 dilution with AEA water.

| Foam test as in Example 1: | |
| --- | --- |
| Foam volume after 5 minutes: | 250 cm$^3$ |
| Foam volume after 5 minutes' standing: | 100 cm$^3$. |

The viscosities, measured as in Example 1, were as follows:

| Temperature (°C.) | Brookfield viscosity at | | Dilution 75:25 (AEA water) 0.3 rpm |
| --- | --- | --- | --- |
| | 0.3 rpm | 30 rpm | |
| | (mPa.s) | | |
| +20 | 1700 | 330 | 8,000 |
| ±0 | 1900 | 510 | 10,000 |
| −5 | 2000 | 450 | 12,000 |
| −10 | 1900 | 440 | 14,000 |
| −25 | 1000 | 160 | — |
| −35 | <1000 | 330 | — |

COMPARATIVE EXAMPLE 1

A fluid was prepared to meet the AEA recommendations for deicing/antiicing of aircraft on ground, 3rd edition, Oct. 1st, 1987, Part 1, specifically the material specification de-/anti-icing fluid, aircraft.

Such a fluid was prepared by mixing the following components:
a) 50% by weight of 1,2-propylene glycol
b) 40% by weight of 1.5% strength by weight thickener solution of CARBOPOL ® 934
c) 0.1% by weight of sebacic acid
1.0% by weight of 1,4-but-2-ynediol
0.5% by weight of benzotriazole
d) 0.2% by weight of an alkylphenol ethoxylated with
8 moles of ethylene oxide e) 0.45% by weight of triethanolamine
f) 0.45% by weight of sodium hydroxide
g) 0.05% by weight of antioxidant
8.75% by weight of water.

The ready-prepared mixture had a pH of 8.5.
The holdover time was 32 minutes.
The viscosity values, determined as in Example 1, were as follows:

| Temperature (°C.) | Brookfield viscosity at 0.3 rpm (mPa.s) | Brookfield viscosity at 30 rpm (mPa.s) | Dilution 75:25 (AEA water) 0.3 rpm |
|---|---|---|---|
| +20 | 8000 | 1400 | 3000 |
| ±0 | 8000 | 1860 | 7000 |
| −5 | 8000 | 1940 | 7500 |
| −10 | 8000 | 1980 | 4000 |
| −25 | 7500 | 2000 | — |
| −35 | 13,000 | >2000 | — |

The deicing/antiicing fluid thus prepared meets the abovementioned AEA specification concerning the holdover time and the maximum viscosities, but, owing to the stationary viscosity at 0° C. of 8000 mPa.s at 0.3 rpm, the runoff characteristics are still not ideal.

COMPARATIVE EXAMPLE 2

A fluid was produced as in Example 3, except that component d) was replaced by the same amount of another nonionic surfactant, an alkylphenol reacted with 8 molecules of ethylene oxide.

The ready-prepared mixture had a pH of 7.2.
The comparative fluid had the following properties:
The holdover time was only 15 minutes.
The viscosities at various temperatures, determined as in Example 1, were as follows:

| Temperature (°C.) | Brookfield viscosity at 0.3 rpm (mPa.s) | Brookfield viscosity at 30 rpm (mPa.s) | Dilution 75:25 (AEA water) 0.3 rpm |
|---|---|---|---|
| +20 | 2000 | 380 | 3000 |
| ±0 | <2000 | 330 | 3500 |
| −5 | <2000 | 310 | 3000 |
| −10 | <2000 | 250 | 3000 |
| −25 | <2000 | 150 | — |
| −35 | <2000 | 350 | — |

We claim:
1. A deicing/antiicing fluid for aircraft based on a glycol, water and a crosslinked polyacrylic acid as thickener, consisting essentially of:
   a) 40–70% by weight of a glycol selected from the group consisting of the alkylene glycols of 2 or 3 carbon atoms and oxyalkylene glycols o from 4 to 6 carbon atoms, or a mixture thereof,
   b) 0.1–1.0% by weight of a crosslinked polyacrylic acid which in the form of a 0.5% strength by weight aqueous solution at pH 7.0 a Brookfield viscometer at 20 rpm,
   c) 0.02–1.5% by weight of a nonionic surfactant formed from an alcohol of from 10 to 20 carbon atoms reacted with from 1 to 10 molecules of a low molecular weight alkoxide,
   d) 0.05–2.0% by weight of one or more corrosion inhibitors,
   e) 0.2–0.7% by weight of a mixture of potassium hydroxide and sodium hydroxide containing up to 70% by weight of potassium hydroxide, or of pure sodium hydroxide, to the fluid pH to 7.0–9.5,
   f) 0.01–0.1% by weight of an antioxidant, and
   g) water to 100% by weight, all the weight percentages being based on the weight of the fluid, and wherein the deicing/antiicing fluid has a holdover time of at least about 30 minutes as measured by the AEA freezing rain endurance test and a viscosity of from about 2000 mPa.s to not greater than about 4000 mPa.s when measured at 20° C. using a Brookfield viscometer at 0.3 rpm.

2. A fluid as claimed in claim 1, wherein component (c) is an oxo alcohol of from 10 to 20 carbon atoms in the carbon chain which has been ethoxylated with from 1 to 10 molecules of ethylene oxide.

3. A fluid as claimed in claim 1, wherein component (e) is a mixture of potassium hydroxide and sodium hydroxide in a ration of from 2.5:1 to 1:2.5.

4. A fluid as claimed in claim 1, which contains components a) to f), in the following amounts:
   a) from 50 to 60% by weight
   b) from 0.2 to 0.6% by weight
   c) from 0.02 to 1.5% by weight
   d) from 0.1 to 2.0% by weight
   e) from 0.2 to 0.7% by weight
   f) from 0.01 to 0.1% by weight
   g) water to make up to 100% by weight.

5. A fluid as claimed in claim 1, wherein said glycol is selected from the group consisting of 1,2-propylene glycol, 1,3-propylent glycol, diethylene glycol and mixtures thereof.

6. A fluid as claimed in claim 2, wherein said nonionic surfactant is an oxo alcohol of from 13 to 15 carbon atoms, ethoxylated with 3 molecules of ethylene oxide.

7. A fluid as claimed in claim 6, wherein said holdover time is 35 times.

8. A fluid as claimed in claim 7, wherein said holdover time is 37 minutes.

9. A fluid as claimed in claim 8, wherein said holdover time is 39 minutes.

10. A fluid as claimed in claim 1, said nonionic surfactant being present in an amount of from 0.02 to 0.3%.

11. A fluid as claimed in claim 10, said nonionic surfactant being present in an amount of from 0.05 to 0.3%.

* * * * *